United States Patent [19]

Cawiezel

[11] Patent Number: 4,969,526
[45] Date of Patent: Nov. 13, 1990

[54] NON-INTERFERRING BREAKER SYSTEM FOR DELAYED CROSSLINKED FRACTURING FLUIDS AT LOW TEMPERATURE

[75] Inventor: Kay E. Cawiezel, Broken Arrow, Okla.

[73] Assignee: Dowell Schlumberger Incorporated, Tulsa, Okla.

[21] Appl. No.: 475,053

[22] Filed: Feb. 5, 1990

[51] Int. Cl.$^5$ .............................................. E21B 43/26
[52] U.S. Cl. .................................... 166/300; 166/308; 252/8.551
[58] Field of Search ............... 166/271, 281, 300, 308; 252/8.551

[56] References Cited

U.S. PATENT DOCUMENTS

| | | | |
|---|---|---|---|
| 3,779,914 | 12/1973 | Nimerick | 166/308 X |
| 3,974,077 | 8/1976 | Free | 166/308 X |
| 4,250,044 | 2/1981 | Hinkel | 166/308 X |
| 4,463,810 | 8/1984 | Hill | 166/308 |
| 4,780,223 | 10/1988 | Baranet et al. | 252/8.551 |

*Primary Examiner*—George A. Suchfield
*Attorney, Agent, or Firm*—Stephen A. Littlefield

[57] ABSTRACT

A tertiary amine hydrochloride/persulfate breaker system as disclosed which effects complete breaks of polysaacharide-based gels or fluids in a the ambient temperature range without interferring with delayed crosslink mechanism in the fracturing fluid. The use of tertiary amine hydrochloride avoids an immediate shift in pH which would counteract means employed to effect a delayed crosslink mechanism.

5 Claims, No Drawings ptember
NON-INTERFERRING BREAKER SYSTEM FOR DELAYED CROSSLINKED FRACTURING FLUIDS AT LOW TEMPERATURE This invention relates to the art of the production of hydrocarbons from a subterranean formation and, more particularly, to a process of fracturing a subterranean formation of low temperature in order to effect increased production of hydrocarbons therefrom.

BACKGROUND OF THE INVENTION

In the fracturing of subterranean formations, a fracturing fluid having grannular insoluble particulate material suspended or slurried therein is injected down a well penetrating the formation and forced back into the formation under pressure. By this method, the formation is caused to crack or fracture thereby offering improved communication between the recoverable fluid such as oil, gas or water in the formation and the well. Fracturing is customarily conducted by employing a thickened or gelled aqueous solution which has suspended therein particles which are substantially insoluble in the liquid and the fluids of the formation at least a portion of the particles thereby being forced to lodge in the fracture created thus propping open the fractures when the fracturing pressures are subsequently released and the well put back into production.

In order to effect clean-up of the thickened, gelled fluid, such fracturing fluids typically employ a breaker system which helps break down the viscosity of the fracturing fluid thereby permitting more easy return of the fluid to the wellbore for clearing the fluid passages for the production of hydrocarbons. One known breaker system employs ammonium or alkaline metal persulfate to break the gel. However, in relatively low temperature oil and gas reservoirs (defined as from about 50° to about 125° F.), a breaker aid in accordance with U.S. Pat. No. 4,250,044, comprising triethanolamine is employed. The specification of U.S. Pat. No. 4,250,044, over which this invention constitutes an improvement is incorporated herein by reference.

One fracturing fluid system which is particularly desirable for use in low temperature wells because of its relatively high proppant-carrying ability and relatively excellent clean-up characteristics are solutions of polysaacharide compounds which are crosslinked with borates. Of particular interest are borate crosslinked systems employing galactomanan gums such as guar or modified guars such as hydroxypropyl guar.

As is well-known in the art, guar-based thickening systems require a length of time in which they are maintained at an acidic pH in order to effect substantially complete hydration of the guar-based materials. In order to effect borate crosslinking of the guar materials, however, the fluid pH must be basic. In typical batch-mix formulations, the guar-based fluid thickener is added to an acidic aqueous solution and includes a borate-releasing compound. Following hydration of the guar material, a pH adjusting solution such as an aqueous solution of base is added to the acidic, hydrated guar solution to shift the pH to the basic side, thereby activating the borate crosslinking mechanism.

More recently, so-called "on-the-fly" or continuous mix operations have been employed in which the pH adjusting component is dispersed in an oil carrier and added to the hydrated acidic guar solution as it is pumped into the wellbore. This method of addition of the base in a hydrophobic slurry causes delay in the release of the pH adjusting material to a point where substantial crosslinking is delayed for a period of about one-half to five minutes so that the development of substantial viscosity due to crosslinking is also delayed thereby reducing the amount of pumping horsepower required to transport the fracturing fluid through the wellbore to the formation.

The triethanolamine breaker aid of the aforementioned U.S. Pat. No. 4,250,044 is, however, incompatible with such a delayed base-release system for delayed crosslinking. Triethanolamine is a relatively strong base and, immediately upon its addition to an acidic, guar-based fracturing fluid containing a borate-releasing compound, the pH of the fluid is shifted to basic and crosslinking is initiated. The advantages in lower pumping horsepower in a delayed crosslink system are thereby lost.

SUMMARY OF THE INVENTION

The present invention provides for a breaker aid which effectively assists the breaking of a crosslinked polysaacharide fracturing solution at relatively low temperature using a persulfate breaker system while not interferring with the desirable initial delay in pH shift which desirably delays the borate crosslinking mechanism of the fracturing fluid.

In accordance with the invention, a subterranean formation penetrated by a borehole wherein the static temperature of the borehole adjacent the formation is within the range of about 50° F. to about 125° F. is fractured by a method comprising injecting into the borehole and into contact with the formation at a rate and pressure sufficient to fracture the formation. A water-based fluid comprising:

(a) an aqueous liquid;

(b) as a thickening agent to increase the viscosity of the aqueous liquid, a viscosity increasing amount of a polysaacharide which is soluble or dispersible in the aqueous liquid;

(c) a borate-releasing compound;

(d) a pH adjusting agent comprising a water-soluble base dispersed in a hydrophobic liquid, and (e) as a breaker to reduce the viscosity of the fluid after said fluid is contacted the formation and after its intended purpose as a viscous fluid having served, the combination comprising an effective amount of (i) triethnolamine hydrochloride, and (ii) at least one compound selected from a group consisting of ammonium persulfates and alkali metal persulfates in at least partially water-soluble form.

DETAILED DESCRIPTION OF THE PREFERRED EMBODIMENT

This invention applies to improving viscosity control of fluids in the practice of fracturing subterranean formation particularly with regard to viscosity control of the fluid in relatively low temperature oil and gas reservoirs (defined as from about 50° F. to 125° F.). More precisely, this invention relates to a tertiary amine hydrochloride/persulfate breaker system which effects complete breaks of delayed crosslinked polysaacharide-based water gels or fluids in the ambient temperature range. In addition, the system does not interfere with delaying of viscosity development of fracturing fluid.

In the process of the present invention, specific fracturing fluid components are dispersed into an aqueous fluid as it is being introduced into and through a borehole (on-the-fly) which penetrates the subterranean formation. The constituents of the fracturing fluid comprise a galactomannan gum, a borate-releasing compound and a compound which adjusts the pH of the fluid from acidic to basic after a certain period of time (a few seconds to a few minutes) and an effective amount of a tertiary amine hydrochloride/persulfate breaker system.

In the fracturing fluid formulation, the rate of change of pH is controlled by changing the concentration of the pH adjusting compound. Then, because of the shift in the pH to basic value, the borate crosslinking mechanism is activated thereby forming a viscous gel. This sequence of steps occurs as the aqueous fluid is being pumped into the borehole so that the viscosity of the aqueous fluid reaches a suitable value prior to its reaching the face of the formation to be fractured. The tertiary amine hydrochloride/persulfate breaker system then reduces the viscosity of the fluid when it is desired which is generally once the intended purpose of the fluid as a fracturing medium and proppant carrier fluid has been served.

Triethanolamine and other amines with $pK_b$ from about 2 to 9 are excellent breaker aids at low temperature but produce a large increase in pH which shifts the pH of the fluid to a basic value prematurely activating the borate crosslinking mechanism thereby forming a viscous gel immediately. No crosslinked time delay is possible with these systems. It has been found that triethanolamine hydrochloride is an excellent breaker aid at low temperature but avoids the shift in pH to a basic value and thus does not interfere with a delayed crosslinking mechanism.

The following non-limiting example will illustrate the effectiveness of the present invention:

EXAMPLE

Mixing Procedure for Breaker Solution

Add 3.84 grams ammonium persulfate to 96.16 grams water. Mix until dissolved.

Mixing Procedure for Breaker Aid Solution

Add 0.96 grams triethanolamine hydrochloride to 99.28 grams water. Mix until dissolved.

Mixing Procedure for Crosslinker Activator Slurry

1. Place hydrocarbon solvent such as diesel in suitable container.
2. Add the dispersing agent such as ethoxylated nonyl phenol and mix at high speed for 5 minutes.
3. Add the suspension agent such as organophyllic clay and agitate with sufficient shear to disperse and activate—usually 30 minutes at high speed.
4. Add the solid base such as MgO, CaO or BaO slowly with mixer at high speed. Continue to mix at high speed for 30 minutes.

NOTE: If the surfactant is in a solid form, the surfactant, suspension agent and basic compound may be dry blended and the blend may then be mixed with the diesel.

Mixing Procedure Base Gel Fluid

1. Pour 500 ml. of water into a blender jar.
2. Add 10 grams of potassium chloride. Adjust the pH to 6-7.5.
3. With the blender running at a speed to create a vortex down to the blades, add 2.4 grams of hydroxypropyl guar. Continue to stir at a lower rate to prevent inclusion of air bubbles in the gel.
4. Add 0.18 grams of boric acid.
5. Allow the gel to hydrate for at least 30 minutes.

Procedure for Mixing Delayed Crosslinked Fracturing Fluid

Crosslink Time Determination

1. Add 400 ml. of base gel fluid into blender jar. Mix at 1800 rpm—enough to form a strong vortex.
2. To vortex add 0.88 ml. (2.2 gal per 1,000 gal fluid) crosslinker activator slurry.
3. Start timing and record time when vortex closes completely.
4. Repeat procedure including in Step 2 the addition of 1 ml. (8 lb per 1,000 gal fluid) ammonium persulfate solution and 1 ml. (2 lb per 1,000 gal. fluid) of triethanolamine hydrochloride solution. Crosslink time is reported in Table 1.

TABLE 1

| Activator Conc. (ml.) | Crosslink Time | | |
|---|---|---|---|
| | Am. Persulfate Conc. (grams) | TEA/HCl Conc. (grams) | Crosslink Time (min.) |
| 0.88 | 0 | 0 | 2:10 |
| 0.88 | 0.38 | 0 | 3:38 |
| 0.88 | 0.38 | 0.096 | 4:50 |

Static Break Time Determination

1. Add 400 ml. of base gel fluid into blender jar. Mix at 1800 rpm—enough to form a strong vortex.
2. To vortex add 1 ml. ammonium persulfate solution and 1 ml. of triethanolamine hydrochloride solution. Also add 0.88 ml. of crosslinker activator slurry.
3. Mix for 1 minute.
4. The crosslinked fluid is then placed in a constant temperature water bath at 100° F. The sample is monitored hourly for viscosity reduction. Low viscosity sample is removed, cooled to room temperature (75° F.) and the viscosity measured using a Fann 35 viscometer, spring factor 1.0 and R1-B1 combination. Breaker time represents time required for viscosity to decrease to less than 10 centipoise at 170 sec$^{-1}$ at 75° F.
5. Fluid showed viscosity less than 10 centipoise at 4 hours.

The amount of breaker employed is that amount required to reduce the viscosity of a given water-based fluid at a temperature within a range from about 50° F. to about 125° F. to a preselected lower viscosity or to a "complete break" as most desired within a desired period of time. The optimum or effective amount of breaker employed depends on factors such as the induction period desired, the particular thickening or gelling agent and its concentration, the particular breaker system employing and the formation temperature. Typically, however, from about 0.25 to about 8 lbs of triethanolamine hydrochloride is employed per 1000 gallons of fracturing fluid. Most preferably, the triethanolamine hydrochloride is present at a concentration of from about 2 to about 8 lbs per 1000 gallons of fracturing fluid. The corresponding amount of persulfate present will typically be within the range of about 0.5 to about 12 lbs per 1000 gallons of fluid. Most preferably, the persulfate breaker is present at a concentration of from about 2 about 8 lbs per 1000 gallons of fluid. The optimum proportion depends on the conditions of the specific application.

While the invention has been described in the more limited aspects of a preferred embodiment thereof, other embodiments have been suggested and still others will occur to those upon a reading and understanding of the foregoing specification. It is intended that all such embodiments be included within the scope of this invention as limited only by the appended claims.

Having thus described my invention, I claim:

1. A method of fracturing a subterranean formation penetrated by a borehole, wherein the static temperature of the borehole adjacent said formation is within the range of from about 50° F. to about 125° F., comprising injecting into the borehole and into contact with the formation at a rate and pressure sufficient to fracture the formation a water-based fluid comprising:
   (a) an aqueous liquid;
   (b) as a thickening agent to increase the viscosity of the aqueous liquid, a viscosity increasing amount of a polysaacharide which is soluble or dispersible in the aqueous fluid;
   (c) a borate-releasing compound;
   (d) a delayed pH control agent comprising a particulate water-soluble base dispersed in a hydrophobic hydrocarbon solution; and
   (e) as a breaker to reduce the viscosity of the fluid after said fluid has contacted the formation and after its intended purpose as a viscous fluid has been served, the combination comprising an effective amount of
      (i) triethanolamine hydrochloride, and
      (ii) at least one compound selected from a group consisting of ammonium persulfates and alkali metal persulfates in at least a partially water-soluble form.

2. The method as set forth in claim 1 wherein said water-based fluid contains per 1000 gallons of fluid from about 0.25 to about 8 lbs triethanolamine hydrochloride and about 0.5 to about 12 lbs of persulfate.

3. The method as set forth in claim 2 wherein said water-based fluid contains per 1000 gallons of fluid about 2 to about 8 lbs of said of said triethanolamine hydrochloride and about 2 to about 8 lbs of said persulfate.

4. The method as set forth in claim 1 wherein the thickening agent is selected from a group consisting of guar and hydroxypropyl guar.

5. The method as set forth in claim 1 wherein said breaker comprises ammonium persulfate.

* * * * *